April 18, 1939.　　　　F. V. BROWN　　　　2,154,832
HYDRAULIC CONTROLLING SYSTEM
Filed Oct. 14, 1935　　　3 Sheets-Sheet 1
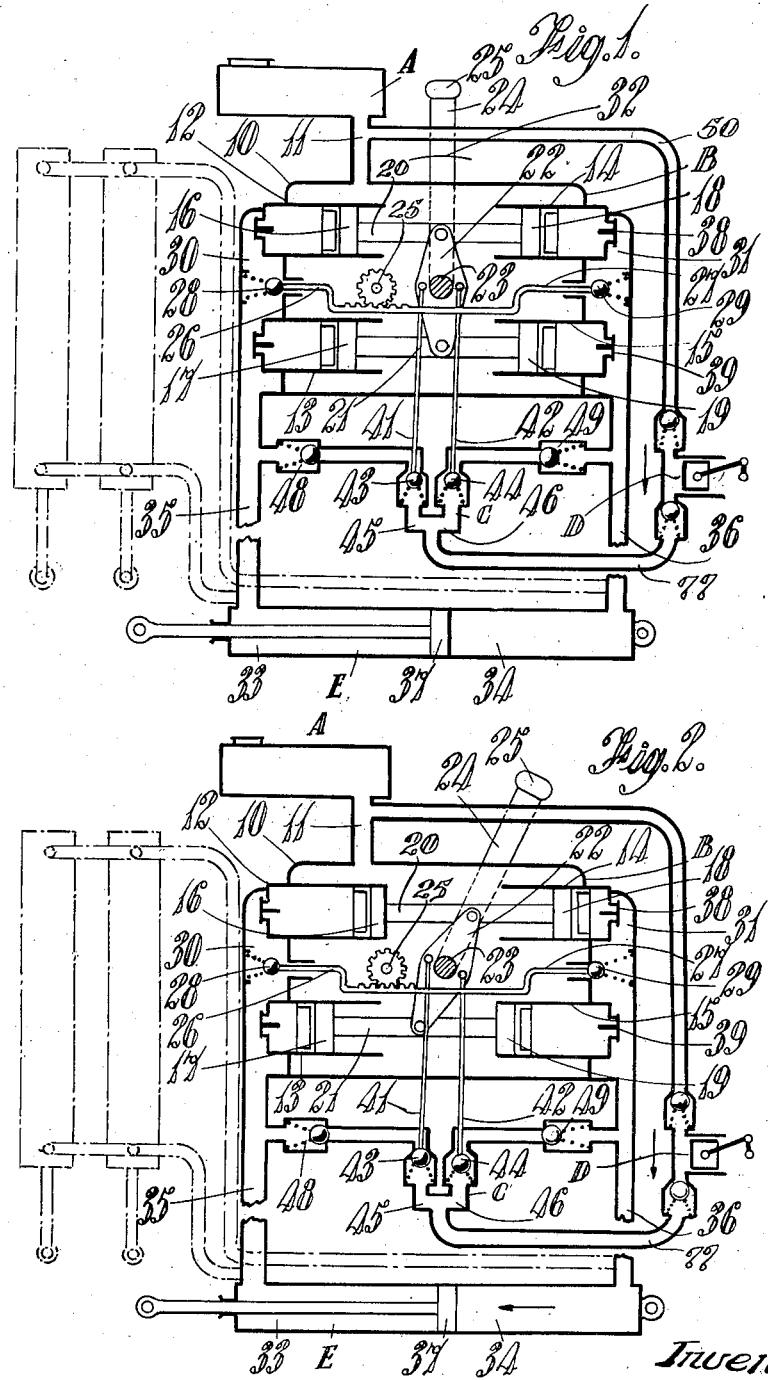
Inventor
Francis V. Brown

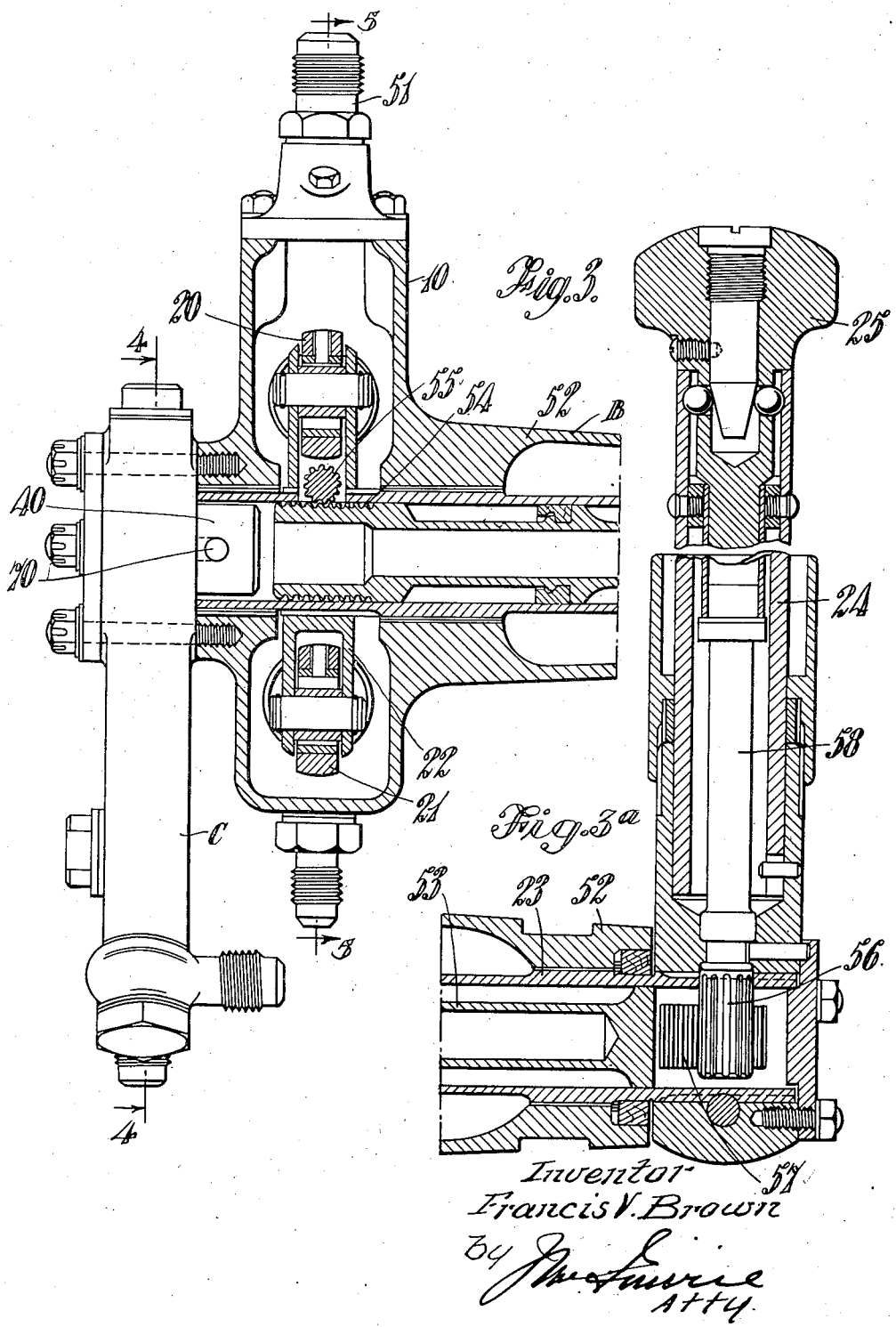

April 18, 1939.   F. V. BROWN   2,154,832
HYDRAULIC CONTROLLING SYSTEM
Filed Oct. 14, 1935   3 Sheets-Sheet 3
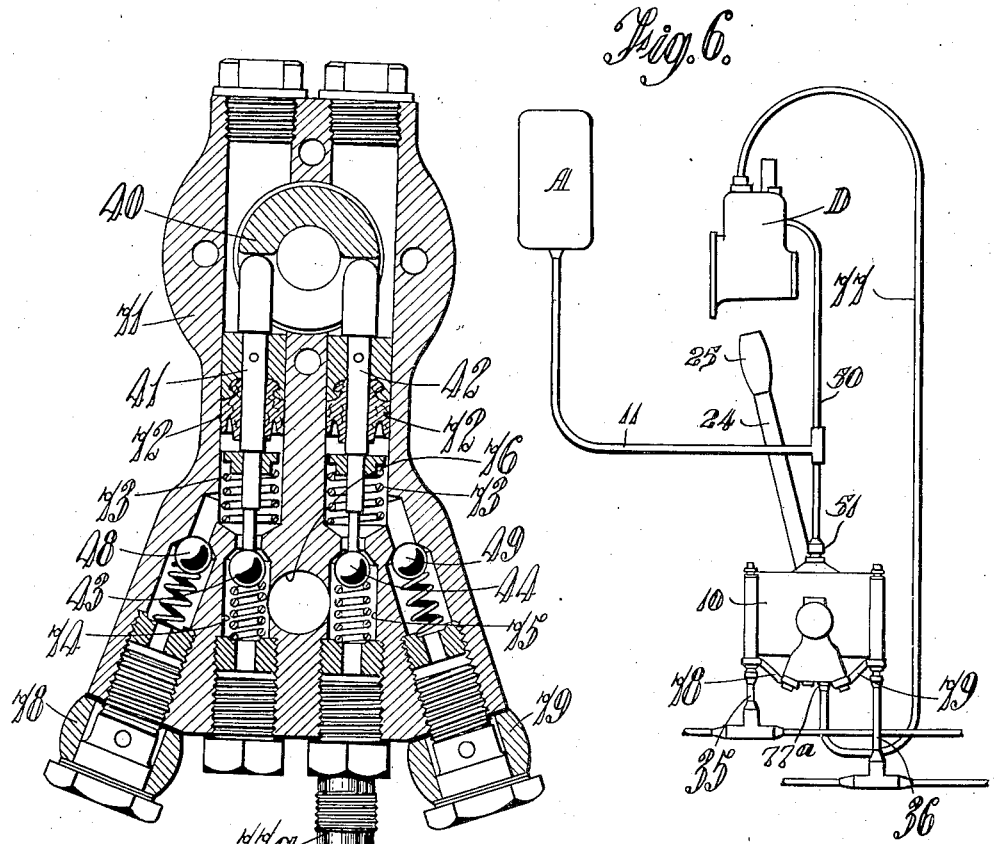
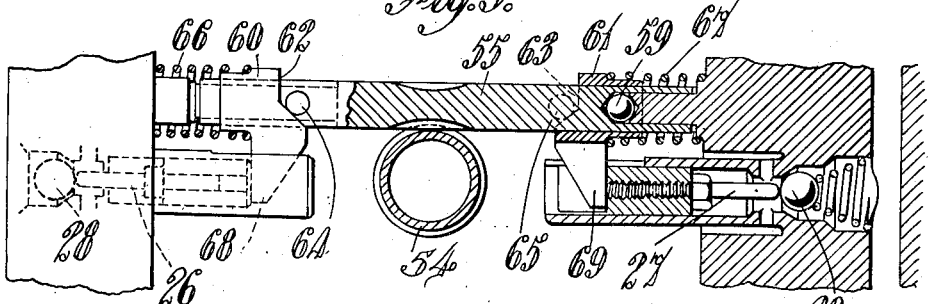
Inventor
Francis V. Brown Patented Apr. 18, 1939

2,154,832

UNITED STATES PATENT OFFICE 2,154,832

HYDRAULIC CONTROLLING SYSTEM

Francis Victor Brown, London, England, assignor to Automotive Products Company Limited, London, England Application October 14, 1935, Serial No. 45,002
In Great Britain March 16, 1935

7 Claims. (Cl. 60—52)

This invention relates to hydraulic controlling mechanism, and it has for its object to provide an improved method and means whereby the capabilities of hydraulic control can be considerably extended not only with regard to the number of devices to be operated or controlled hydraulically, but also in respect of the actual work done by the hydraulic controls.

This result is obtained in accordance with the invention by a method of operating a hydraulic controlling system, which consists in providing a mechanically driven pump and a manually operated source of liquid pressure for alternative actuation of hydraulically controlled elements, such as hydraulic jacks. As a modification the invention provides a method consisting in utilizing for the purpose of controlling the flow of fluid from a mechanically driven pump, a member which itself constitutes the operating means of a manually actuated pump.

Thus, in a hydraulically controlled system in which liquid under pressure in a closed circuit serves to transmit power or movement, according to the invention pressure-producing means are provided comprising in combination a mechanically driven pump and a manually operated pump, either of which can be used independently of the other.

As a further feature, in a hydraulic controlling system in which pressure is produced normally by a mechanically driven pump or equivalent, the output from which is controlled by a manually operated member, according to the invention said manually operated member is adapted also to actuate manually operated pumping means should the mechanically driven pump be inoperative. It will be understood that the improved method, although particularly applicable to aircraft may be applied for other purposes, while, of course, the term "manually operated" is intended to cover all forms of actuation which are not mechanical, for example pedal actuation.

The improved system is preferably arranged so that no changing over operation is required for bringing the manual means into action, non-return valves or equivalent being employed so that either the mechanical or manual operation can be effected at will at any time.

One general form of system according to the invention is illustrated in the accompanying drawings in which Figure 1 is a diagram illustrating the layout and connections of a system employing hydraulic jacks, the parts of the system being in their inoperative positions;

Figure 2 is a diagram corresponding to Figure 1 showing the position of the valves when the plunger of the jack is being moved to the left by the mechanically actuated pump;

Figures 3 and 3a collectively illustrate in fragmentary sectional side elevation one construction of combined manual pump and controlling means;

Figure 4 is a sectional front elevation of the control valve incorporated in Figure 3;

Figure 5 is a fragmentary front elevation showing the means employed for rendering inoperative either one or both of the bleeder valves of the manual pump; and Figure 6 is a diagram to a reduced scale showing the pipe connections for the pump construction illustrated in Figures 3 to 5.

Referring firstly to Figures 1 and 2 in which the component parts of the preferred system are shown diagrammatically, it will be seen that the component parts comprise a reservoir A, a manual pump unit B with which is associated a selector valve unit C, a mechanically driven pump D and one or more hydraulic jacks E or other devices requiring to be controlled or actuated by fluid pressure.

The manual pump unit comprises briefly an outer casing 10 which is maintained full of liquid from the reservoir A by means of a pipe line 11, said casing 10 being fitted with four master cylinders 12, 13, 14 and 15 arranged substantially as described in British Patent No. 428,252 of May 9, 1935. Each of these cylinders is provided with a piston, these being indicated at 16, 17, 18 and 19 and being connected in pairs by bars 20 and 21. Each piston includes a packing cup which yields to permit flow from the reservoir 10 to the interior of the associated cylinder, but prevents return flow, as does the corresponding structure indicated in McDougall Patent No. 2,004,078 granted June 4, 1935. For actuating the pump manually these bars 20 and 21 are engaged by a rocker 22 carried by a spindle 23 passing through the casing 10, to the exterior of which it is fitted with an operating handle 24. The upper end of this handle carries a knob 25 which is arranged for rotation relative to the handle 24 for the purpose of controlling a pair of push rods 26 and 27 associated with corresponding bleeder valves 28 and 29. The mechanical means employed for this purpose are not shown in Figures 1 and 2, but, in effect, rotation of the knob 25 in a clockwise direction when viewed from the top, causes the rods 26 and 27 to be moved to the left, thus allowing the bleeder valve 29 to engage its seating. When the knob 25 is in its normal or neutral position both of the valves 28 and 29 are held off their seatings.

The bleeder valves 28 and 29 are arranged to control communication between the interior of the casing 10 which is, of course, under low pressure, and a pair of delivery chambers 30 and 31 into which liquid is forced under pressure by the pistons 16, 17 and 18, 19 respectively when the handle 24 is moved backwards and forwards as indicated by the arrow 32.

The jacks E are of the double acting variety and are provided each with two working spaces 33 and 34, these being connected respectively with the delivery chambers 30 and 31 by means of service pipes 35 and 36, so that when the pump unit B is manually operated liquid under pressure will be forced along one of the service pipes for actuating the jack, while the liquid rejected at the other end of the master cylinder is returned to the casing 10 through the open bleeder valve. Thus the direction in which the knob 25 is initially rotated determines which way the pistons 37 of the jacks E are moved, and assuming said knob is turned so as to move the rods 26 and 27 to the left the bleeder valve 29 will be allowed to close, thus enabling liquid to be forced by the pistons 18 and 19 through corresponding delivery valves 38 and 39 into the service pipe 36 and the working chamber 34 of each of the jacks E. At the same time the bleeder valve 28 is held open so that the discharge from the cylinders 12 and 13 merely passes back into the casing 10, while the liquid rejected by the contraction in the working space 33 of each of the jacks E also passes through the bleeder valve 28 into the casing 10. By rotating the knob 25 in the opposite direction the bleeder valve 28 is allowed to close, and oscillatory movement imparted to the handle 24 will then cause the piston 37 of the jack E to be moved in the opposite direction.

Associated with the spindle 23 is a valve rocker indicated at 40, which serves to actuate the selector valve C by means of a pair of plunger rods 41 and 42 which, in the neutral position of the rocker 40, hold a pair of balls 43 and 44 off their seats. As will be seen in Figure 1 both branches 45 and 46 of the selector valve C are fed by the delivery pipe 77 of the mechanically operated pump D and serve to deliver liquid under pressure through non-return valves 48 and 49 respectively into the service pipes 35 and 36 respectively. The inlet of the pump D is fed by means of a pipe 50 connected with the pipe 11 or with the casing 10. The pump D, which can be driven from the aircraft engine, an electric motor, a propeller in the slip-stream or any other mechanical source of power, can be arranged to operate continuously, and with the handle 24 and knob 25 in their neutral positions will merely serve to circulate liquid past both valves 43 and 44 and thence into the casing 10 from which it is in turn withdrawn through the pipe 50. If, however, it is required to move the piston 37 of the jack or jacks E to the left, i. e. charge the working space 34 with liquid under pressure as shown in Figure 2, the knob 25 is rotated clockwise, thus allowing the bleeder valve 29 to close as hereinbefore described. The handle 24 is also moved to the right and retained in that position so that the left hand end of the rocker 40 is raised and the push rod 41 thus allows the valve 43 to close. This prevents liquid from the pump D passing through the open bleeder valve 28, and it is, therefore, delivered through the valve 44 into the pipe 36 from which it cannot escape except into the working space 34. At the same time fluid rejected from the working space 33 of the jack or jacks E flows past the open bleeder valve 28 into the casing 10. When movement of the jack piston 37 in the other direction is required, exactly the opposite procedure is adopted, the knob 25 being twisted anti-clockwise so as to allow the bleeder valve 28 to close, and the handle 24 is moved to the left, thus allowing the valve 44 to close the passage 46 to prevent the flow of high pressure liquid delivered by the pump D. It will be seen that when the handle 24 is oscillated for operating the pump B manually, the valves 43 and 44 are alternately allowed to close but this does not affect the working of the pump B owing to the provision of the non-return valves 48 and 49.

One constructional example of pump unit B arranged to work in accordance with the foregoing description is shown in Figures 3, 4 and 5. The pump casing 10 is fed with liquid from the reservoir A through a pipe connection 51 shown as 11 in Figures 1 and 2, and is formed at its rear with a tubular extension 52 arranged to serve as a bearing for the spindle 23, which latter carries at its inner end a rocker 22 connected at its extremities with the connecting bars 20 and 21 respectively. The spindle 23 is tubular, and is fitted internally with an axially movable control member 53 which is grooved circumferentially at 54 so as to produce a toothed rack engaging with teeth upon a rod 55, the latter being thus rotated about its axis by endwise movement of the control member 53. This movement is brought about by the engagement of a pinion 56 with a rack 57 carried by the member 53, said pinion 56 being formed on the end of a rod 58 which extends within the operating handle 24 and terminates in the knob 25. Thus reciprocatory movement imparted to the handle 24 is transferred by the spindle 23 to the rocker 22, and thence to the various pistons, and the controlling member 53 also shares this movement, without, however, affecting the angular position of the rod 55.

The action of this spindle is shown more clearly in Figure 6, from which it will be seen that the rod 55 is located against axial movement by a ball 59 provided at each end. The rod 55 is also encircled by a pair of collars 60 and 61 formed with cam surfaces 62 and 63 which engage with radial pins 64 and 65, said collars normally being forced inwards by means of helical compression springs 66 and 67. Ears 68 and 69 formed upon the collars 60 and 61, respectively, are adapted to cooperate with the push rods 26 and 27, respectively, by which latter the bleeder valves 28 and 29 are normally held off their seats, when the rod 55 is in its neutral position as shown in Figure 5. Upon angular movement of the rod 55 taking place in either direction, however, one or other of the valves 28 and 29 is allowed to seat, thus permitting liquid pressure to be produced in the corresponding service pipe 35 or 36.

The selector valve unit C is incorporated with the pump unit B as shown in Figure 3, and is actuated from the spindle 23 by the engagement of a transverse pin 70 upon the rocker 40 with corresponding notches formed in the end of the tube 23. The general construction of the selector valve is shown more clearly in Figure 4, said valve comprising a body 71 which is bored vertically to receive the push rods 41 and 42, resilient packing cups 72 being provided to prevent leakage of fluid. The rods 41 and 42 are normally urged in an upward direction by means of coiled springs 73 and are thus caused to remain in permanent engagement with the rocker member 40, although when the latter is in its neutral position the lower ends of the push rods 41 and 42 hold the balls 43 and 44 off their seats. The bores 74 and 75 are connected together by an intermediate hole 76, while a pipe union 77a serves to connect both with the delivery of the pump unit D by means of a pipe 77, as shown in Figure 6. The non-return valves 48 and 49 are also accommodated in the body 71, and are connected by means of banjo connections 78 and 79 with the service pipes 35 and 36 respectively.

When the mechanically driven pump is not working, the non-return valves 48 and 49 in the two branches of the selector valve C prevent the flow of liquid back into the mechanically driven pump D, and thus enable the manually operated pump B to be worked in the usual way by a repeated oscillatory movement of the handle 24 when once the correct bleeder valve has been allowed to close by angular movement of the knob 25 about its longitudinal axis.

The selector valve forms a compact unit which thus conveniently forms part of the manually operated pump.

The improved system according to the invention can be used for effecting a large number of mechanical operations such as applying and controlling brakes, controlling and/or operating guns, while on an aircraft in particular it may, for example, be used for raising and lowering the undercarriage, raising and lowering the tail wheel, varying the position of aerofoil flaps, and for attaching or releasing any member which may be a part of or which may be carried by the aircraft. Where independent movement is required this can be obtained by the use of suitable valves for directing the pressure liquid, but in the preferred arrangement a separate manually operated pump is used for each individual part requiring independent actuation. Each of these pumps is fitted with its own selector valve, but, of course, only one mechanically driven pump is required for feeding the whole of the selector valves, although more than one mechanically driven pump can be used if desired.

What I claim is:—

1. The combination with a double-acting, liquid pressure, remote-control piston 37 and a cylinder in which said piston is reciprocable, of a reservoir 10 adapted to supply liquid to either selected end of said cylinder, a pair of pipes 35, 36 connecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough.

2. The combination with a double-acting, liquid pressure, remote-control piston 37 and a cylinder in which said piston is reciprocable, of a reservoir 10 adapted to supply liquid to either selected end of said cylinder, a pair of pipes 35, 36 connecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough, said mechanical means including a rocker arm having an actuating handle by which it may be swung about a transverse axis to produce operation of said second-named set of valves, and said handle being rotatable about the longitudinal axis of said rocker arm to control operation of the first-named set of valves.

3. The combination with a double-acting, liquid pressure, remote-control piston 37 and a cylinder in which said piston is reciprocable, of a reservoir 10 adapted to supply liquid to either selected end of said cylinder, a pair of pipes 35, 36 connecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough, said mechanical means including members operating individually upon each of said sets of valves to hold said valves in flow-permitting positions respectively, thereby allowing free circulation of liquid into and out of the reservoir, without operative effect upon said piston.

4. The combination with a double-acting, liquid pressure, remote-control piston 37 and a cylinder in which said piston is reciprocable, of a reservoir 10 adapted to supply liquid to either selected end of said cylinder, a pair of pipes 35, 36 connecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough, said mechanical means including a rocker arm having an actuating handle adapted to swing said rocker arm about a transverse axis to produce operation of said second-named set of valves, and said handle being rotatable about the longitudinal axis of said rocker arm to control operation of the first-named set of valves, and in its neutral position operating to cause each of said first-named set of valves to be held in flow-permitting position, thereby allowing free circulation of liquid into and out of the reservoir without operative effect upon said piston.

5. The combination with a double-acting, liquid pressure, remote-control piston 37 and a cylinder in which said piston is reciprocable, of a reservoir 10 adapted to supply liquid to either selected end of said cylinder, a pair of pipes 35, 36 connnecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough, said mechanical means including a rocker arm having an actuating handle adapted to swing said rocker arm about a transverse axis to produce operation of said second-named set of valves, and said handle being rotatable about the longitudinal axis of said rocker arm to control operation of the first-named set of valves, and in its neutral position operating to cause each of said first-named set of valves to be held in flow-permitting position, thereby allowing free circulation of liquid into and out of the reservoir without operative effect upon said piston, a third set of valves, each of which is adapted to open into one of said first-named pipes, and pump means mechanically linked with said rocker arm to produce pressure application to said third set of valves in accordance with the direction of swing of said rocker arm from its neutral position, and hence to produce movement of said piston in the desired direction.

6. The combination with a double-acting, liquid pressure, remote-control piston 37 and a cylinder in which said piston is reciprocable, of a reservoir 10 adapted to supply liquid to either selected end of said cylinder, a pair of pipes 35, 36 connecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough, said mechanical means including a rocker arm having an actuating handle by which it may be swung about a transverse axis to produce operation of said second-named set of valves, and said handle being rotatable about the longitudinal axis of said rocker arm to control operation of the first named set of valves, a third set of valves, each of which is adapted to open into one of said first-named pipes, and pump means mechanically linked with said rocker arm to produce pressure application to said third set of valves in accordance with the direction of swing of said rocker arm from its neutral position, and hence to produce movement of said piston in the desired direction.

7. The combination with a double-acting liquid pressure, remote-control piston 37 and a cylinder in which said piston is reciprocable, of a reservoir 10 adapted to supply liquid to either selected end of said cylinder, a pair of pipes 35, 36 connecting said reservoir with the opposite ends of said cylinder, so that one pipe serves as a delivery pipe with respect to said cylinder while the other pipe simultaneously serves as an exhaust pipe to return liquid to said reservoir, means including a set of valves 28, 29 controlling flow between said reservoir and said pipes, a second pair of pipes each of which communicates with one of said first-named pair of pipes and each of which includes a valve 43, 44 controlling flow therethrough, mechanical means 24, 40, 41, 42 for holding both said last-named valves in flow-permitting position, means for closing one of said last-named valves when said mechanical means is shifted, and means 26, 27 movable during such a shifting or at any other time to cause movement of one of said first-named valves to a position cutting off communication between said reservoir and that particular one of said first-named pipes which has communication with that particular one of said second-named pipes whose valve is then in position permitting liquid flow therethrough, a third set of valves, each of which is adapted to open into one of said first-named pipes, and pump means to produce pressure application to said third set of valves in accordance with the direction of movement of said mechanical means from its neutral position, and hence to produce movement of said piston in the desired direction.

FRANCIS VICTOR BROWN.